(12) United States Patent
Marui

(10) Patent No.: US 9,994,272 B2
(45) Date of Patent: Jun. 12, 2018

(54) BICYCLE SADDLE

(71) Applicant: Shinji Marui, Kobe (JP)

(72) Inventor: Shinji Marui, Kobe (JP)

(*) Notice: Subject to any disclaimer, the term of this patent is extended or adjusted under 35 U.S.C. 154(b) by 72 days.

(21) Appl. No.: 15/250,580

(22) Filed: Aug. 29, 2016

(65) Prior Publication Data

US 2018/0057090 A1    Mar. 1, 2018

(51) Int. Cl.
*B62J 1/00* (2006.01)
*B62J 1/26* (2006.01)

(52) U.S. Cl.
CPC ...................... *B62J 1/26* (2013.01)

(58) Field of Classification Search
CPC ......... B62J 1/20; B62J 1/18; B62J 1/26; B62J 1/22; B62J 1/00; B62J 1/007; Y10S 297/02
USPC ...... 297/195.1, 202, DIG. 2, 215.16, 452.15, 297/215.1
See application file for complete search history.

(56) References Cited

U.S. PATENT DOCUMENTS

| | | | | | |
|---|---|---|---|---|---|
| 5,348,369 | A | * | 9/1994 | Yu | B62J 1/00 297/195.1 |
| 6,976,736 | B2 | * | 12/2005 | Yu | B62J 1/00 297/215.16 |
| 7,866,744 | B2 | * | 1/2011 | Bigolin | B62J 1/00 297/195.1 |
| 8,128,164 | B2 | * | 3/2012 | Segato | B62J 1/007 297/202 |
| 9,669,889 | B2 | * | 6/2017 | Yu | B62J 1/00 |
| 2005/0046245 | A1 | * | 3/2005 | Yu | B62J 1/00 297/214 |
| 2005/0121951 | A1 | * | 6/2005 | Yu | B62J 1/00 297/195.1 |
| 2009/0212608 | A1 | | 8/2009 | Rinard et al. | |
| 2016/0144914 | A1 | | 5/2016 | Jay | |

FOREIGN PATENT DOCUMENTS

| | | |
|---|---|---|
| EP | 1132282 A2 | 9/2001 |
| JP | 2007186075 A | 7/2007 |
| JP | 2016097849 A | 5/2016 |
| WO | 2004031025 A1 | 4/2004 |
| WO | 2016020943 A1 | 2/2016 |

OTHER PUBLICATIONS

International Search Report & Written Opinion dated Oct. 31, 2017 from PCT Application No. PCT/IB2017/054186.

* cited by examiner

*Primary Examiner* — Chi Q Nguyen
(74) *Attorney, Agent, or Firm* — Innovation Capital Law Group, LLP; Vic Lin

(57) ABSTRACT

A lightweight bicycle saddle includes shock absorption padding in key locations to cushion a rider in various riding positions. The padding may be attached to a top surface of a saddle base or formed integrally with the base. The padding may also be configured as a web to operate with a web saddle. The padding includes a left portion and a right portion which may be formed separately or integrally. The padding may have a wider rear padded portion located in a rear saddle portion of the saddle and a tapered or narrow front padded portion located in a front saddle portion. The padding may be positioned to cover areas where the rail is attached to the saddle base. The padding is surrounded by non-padded portions which have a lesser cushion or no cushion.

22 Claims, 6 Drawing Sheets

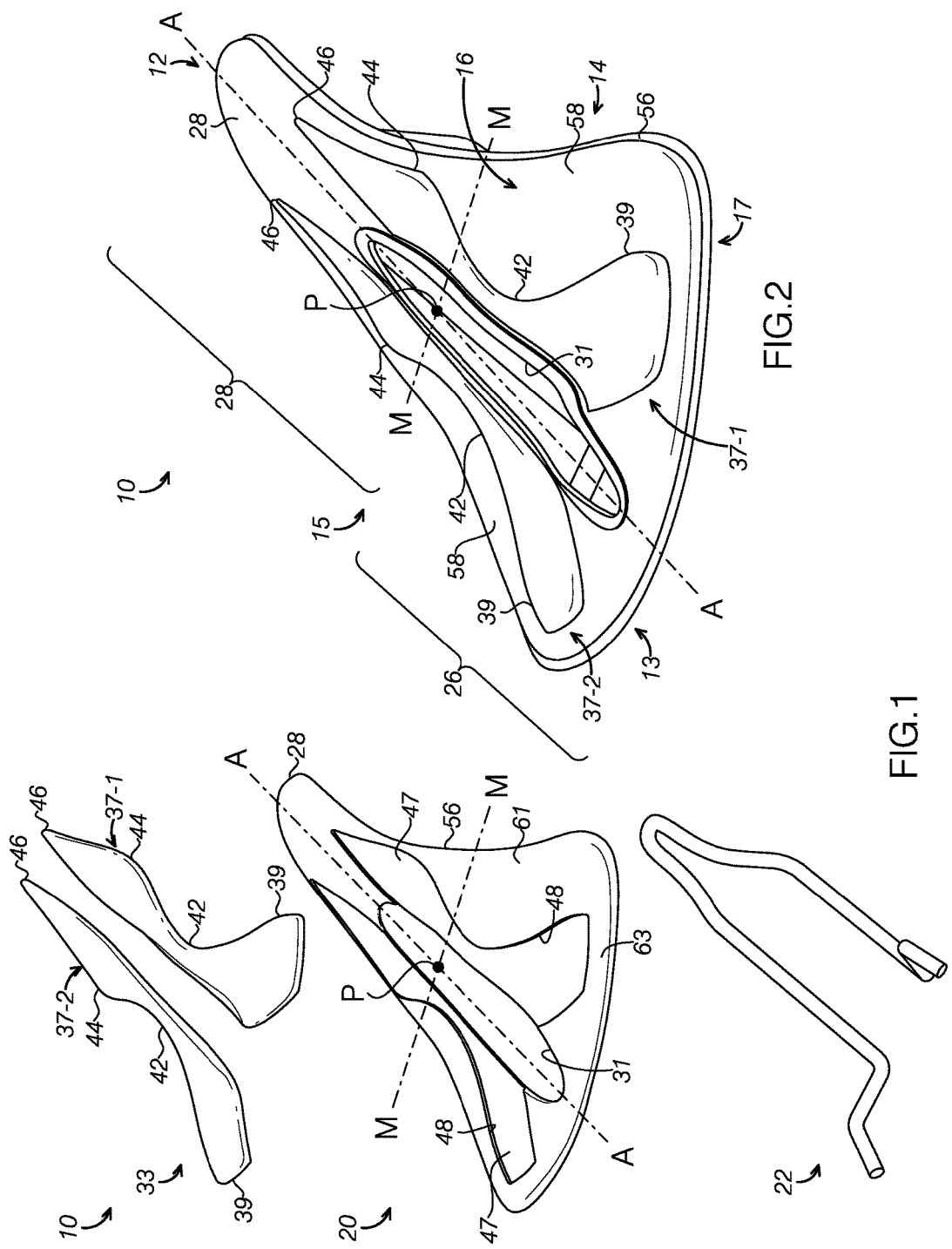

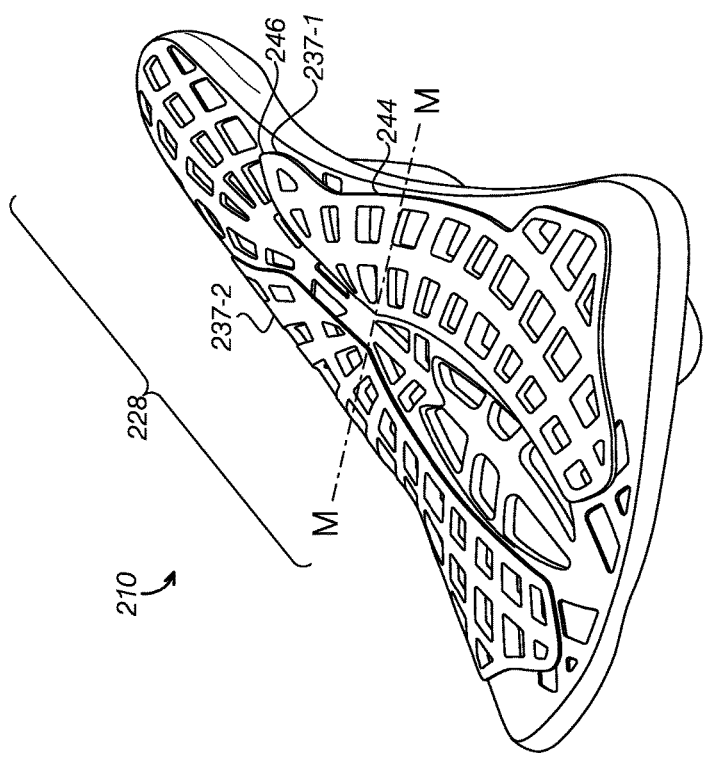
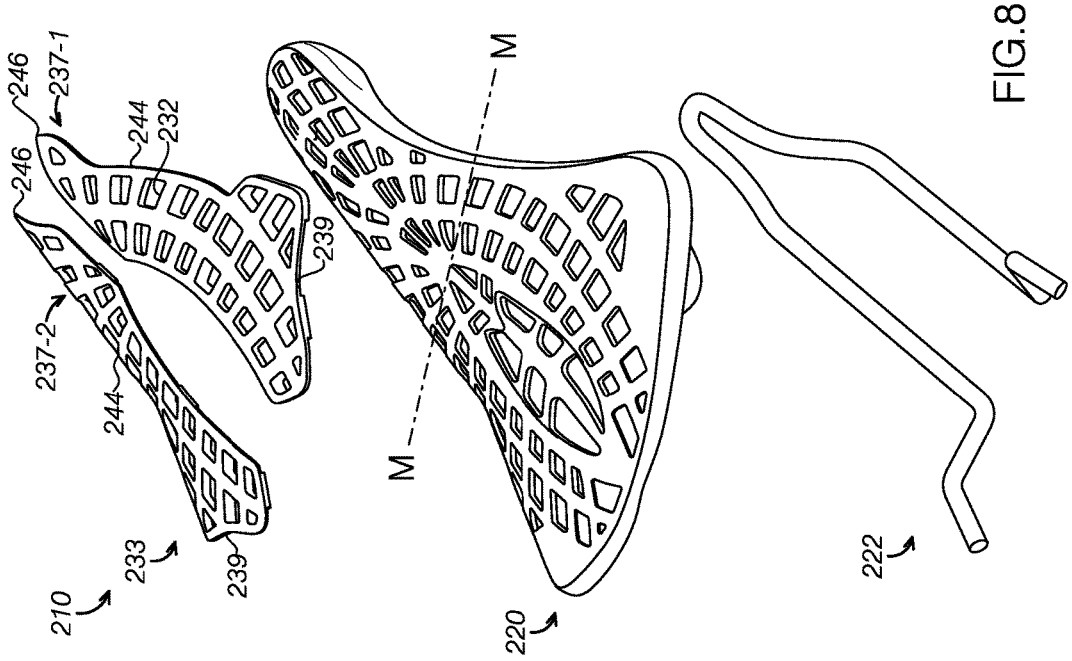

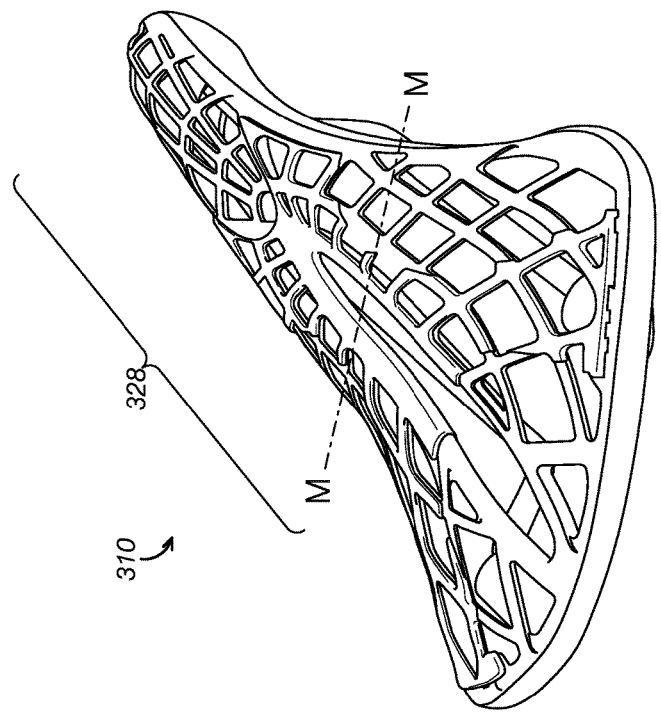
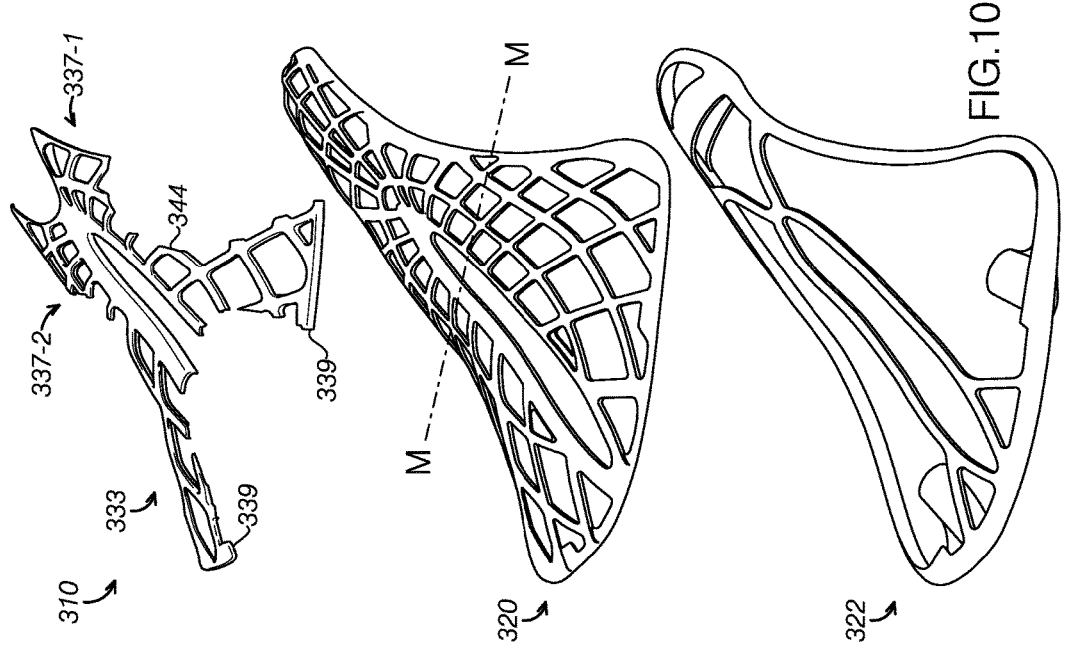
FIG.10
FIG.11

BICYCLE SADDLE

BACKGROUND OF THE INVENTION

1. Field of the Invention

The invention relates generally to bicycle saddles.

2. Description of Prior Art and Related Information

A conventional bicycle saddle has thick shock absorbent padding is disposed over the entire saddle except for the bottom. Thus, the entire top surface and edges of the conventional saddle are covered in shock absorbent padding. This leads to a waste of materials and extra weight.

Furthermore, such excessively padded seats can be uncomfortable for sport riders who tend to lean forward when riding. Some of the pedaling force is absorbed by the excessive padding, with the result that this force is not properly converted to drive force, thereby wasting the energy of the rider. In situations where precise machine control is necessary, rider input is transmitted to the drivetrain at a slight delay, negatively affecting the rider's sense of direct machine control.

SUMMARY OF THE INVENTION

In accordance with the present invention, structures and associated methods are disclosed which address these needs and overcome the deficiencies of the prior art.

In one aspect, a bicycle saddle is provided according to a preferred embodiment of the invention. The saddle comprises a saddle base and a shock absorbent saddle padding that may be thinner, thicker or the same thickness as the material of the saddle base. Furthermore, the thickness of the padding may vary along the length and width of the saddle. The saddle padding is preferably softer than the saddle base. The saddle base defines a midline between a front saddle end and a rear saddle end. The saddle padding is positioned on the saddle base so as to form padded portions surrounded by non-padded portions, the padded portions comprising a front padded portion positioned in front of the midline. The saddle padding may comprise an hourglass shape.

In one preferred embodiment, the saddle base comprises a recessed section at least 1 mm deep to receive the padded portions which are separate from the saddle base. The shape of the recessed section conforms to the shape or periphery of the padded portions.

The saddle padding may also be integral with the saddle base. In such an embodiment, the saddle base is composed of a first resin material while the saddle padding is composed of a second resin material that is more flexible than the first resin material.

In another aspect, a bicycle saddle comprises a saddle base including a base thickness, a rail coupled to a bottom of the saddle base at a rail attachment point, and saddle padding disposed on a top side of the saddle base and having a padding thickness noticeably thicker than the base thickness. The saddle padding is positioned in locations above the rail attachment point. The saddle padding is surrounded by non-padded portions of the saddle base. The saddle padding may comprise an hourglass shape.

The saddle base may comprise a recessed section at least 1 mm deep to receive the padded portions. The shape of the recessed section conforms to the shape or periphery of the padded portions.

The saddle padding may be separate from the saddle base. The saddle padding may be integral with the saddle base. In such an embodiment, the saddle base is preferably composed of a first resin material while the saddle padding is composed of a second resin material that is more flexible than the first material.

In a further aspect, a bicycle saddle comprises a saddle base including a base thickness, a saddle front end and a saddle back end. The saddle base defines a transverse midline intersecting a center between the saddle front end and the saddle back end. A rail is coupled to a bottom of the saddle base at a first forward rail attachment point and a second rear attachment point. Saddle padding is disposed on a top side of the saddle base and having a softness noticeably greater than that of the base. The saddle padding is positioned in locations above the first and second rail attachment points. The saddle padding is surrounded by non-padded portions of the saddle base, which may comprise no cushion at all or a cushion material with lesser thickness and softness than that of the padding. The saddle padding comprises a padded portion positioned in front of the midline. The bicycle saddle padding may comprise an hourglass shape.

The saddle base may comprise a recessed section at least 1 mm deep to receive the padded portions. The shape of the recessed section conforms to the shape or periphery of the padded portions.

The saddle padding may be separate from the saddle base. The saddle padding may be integral with the saddle base. The saddle base may be composed of a first resin material while the saddle padding may be composed of a second resin material that is more flexible than the first material.

The saddle padding may comprise a top saddle surface that protrudes above a top surface of the non-padded saddle base portions.

In summary, a lightweight bicycle saddle includes shock absorption padding in key locations to cushion a rider in various riding positions. The key locations are configured to support the rider's ischial tuberosities and adjacent tissues. The padding may be attached to a top surface of a saddle base or formed integrally with the base. The padding may also be configured as a web to operate with a web saddle. The padding includes a left portion and a right portion which may be formed separately or integrally. The padding may have a wider rear padded portion located in a rear saddle portion of the saddle and a tapered or narrow front padded portion located in a front saddle portion. The padding may be positioned to cover areas where the rail is attached to the saddle base. The padding is surrounded by non-padded portions which may comprise no cushion or a lesser cushion.

BRIEF DESCRIPTION OF THE DRAWINGS

FIG. 1 is an exploded perspective view of a first preferred embodiment of a bicycle saddle;

FIG. 2 is a perspective view of the first preferred embodiment of a bicycle saddle;

FIG. 8 is an exploded perspective view of a second preferred embodiment of a bicycle saddle;

FIG. 9 is a perspective view of the second preferred embodiment of a bicycle saddle;

FIG. 10 is an exploded perspective view of a third preferred embodiment of a bicycle saddle;

FIG. 11 is a perspective view of the third preferred embodiment of a bicycle saddle.

Figure 3:
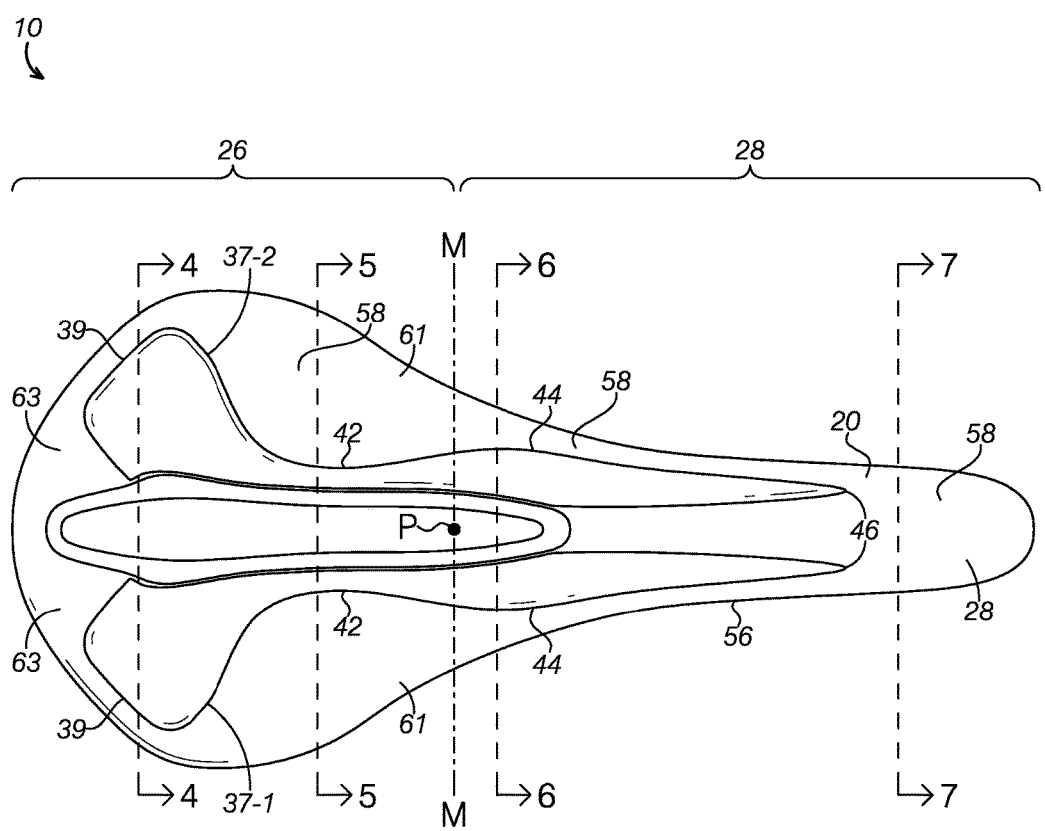
FIG. 3 is a top plan view of the first preferred embodiment of a bicycle saddle.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS

Preferred embodiments according to the present invention will be described in detail below, referencing the drawings. Note that the scope of the present invention is not limited to the embodiments or drawings set forth below, but rather may be altered and modified in many ways.

FIGS. 1-2 illustrate a first preferred embodiment of a bicycle saddle, or simply apparatus or saddle, 10. The saddle 10 comprises a front end 12, back end 13, right side 14, a left side 15, top 16 and bottom 17. The saddle 10 includes a base 20 mounted on railing 22 which may be metallic, and shock absorbent padding 33 strategically positioned on top of the base 20 or formed integrally with the base 20. As used throughout the specification, "padding" or "padded" refers to a shock absorbent first material that may be softer, harder or have other tactile characteristics different from those of a second material that forms the remainder of the saddle 10. The padding may have a thickness that is greater than, lesser than or equal to the thickness of the non-padded portions. The "non-padded" second material may comprise a cushion with lesser thickness and softness, or no cushion at all. The greater thickness and softness of the padding may be noticeable by sight and/or touch. As used throughout this specification, "non-padded" means a material having a lesser thickness or cushion effect than that of the padding. "Non-padded" does not necessarily mean no cushion whatsoever. "Non-padded" may include no cushion or a cushion with a lesser softness and/or thickness than that of the padding.

In the preferred embodiment, the padding comprises a thickness in the range of 3 mm to 20 mm while non-padded portions comprise a thickness in the range of _0 mm to 5 mm.

As discussed further below, the padding 33 is placed in strategic locations to support the rider's ischial tuberosities and adjacent tissues in a variety of riding positions ranging from a casual upright riding position (e.g., riding a cruiser) to a hunched forward sporty/speedy riding position (e.g., riding a road bike). At the same time, the padding 33 is not placed in other areas of the saddle 10 where a rider's sitting bones would not need support. As discussed further below, those portions of the saddle 10 that need not support the sitting bones may have lesser cushioning or no cushioning at all. In the first preferred embodiment, the padding 30 is preferably molded separately from the base 20.

The saddle 10 defines a longitudinal axis A extending between the front end 12 and back end 13. The saddle 10 further comprises a midline M that defines a transverse plane dividing a rear saddle portion 26 from a front saddle portion 28. The midline M extends through a midpoint between the front saddle end 12 and back saddle end 13. The rear saddle portion 26 is preferably wider than the front saddle portion 28. The edge or periphery of the first preferred saddle 10 preferably forms a pear shape as shown in the top perspective view of FIG. 2. An optional central longitudinal slit 31 may be formed to save material and weight.

The base 20 is preferably composed of a generally rigid, lightweight material such as resin. In the first preferred embodiment, the saddle 10 comprises shock absorption padding 33 composed of a generally soft or pliant material formed with a padding thickness greater than the thickness of the non-padded base 20. The padding 33 preferably comprises a pair of elongate padded portions 37-1, 37-2 extending along the right and left sides of the saddle 10 and positioned in areas configured to support the ischial bones (i.e., "sitting bones") of the rider.

From back to front as shown in FIGS. 2 and 3, each padded seat portion 37-1, 37-2 preferably comprises a rear padded portion 39 with the greatest width in the range of 50 mm to 130 mm that leads to a slim middle padded portion 42 resembling a slender waistline with a width in the range of 10 mm to 40 mm, which then leads to a widened front padded portion 44 with a width in the range of 20 mm to 80 mm and terminates at a tapered front padded tip 46. The widened front padded portion 44 and narrow padded tip 46 of each padded portion 37-1, 37-2 are preferably positioned in the front saddle portion 28, and thus in front of the midline M.

The elongate padded portions 37-1, 37-2 are preferably symmetrical and separately molded from the base 20. Collectively, the pair of symmetrically elongate padded portions 37-1, 37-2 form an hourglass shape. It will be appreciated that the first preferred saddle 10 comprises padding 44, 46 located in the front saddle portion 28 which will bear the load of the rider's ischial tuberosities and surrounding tissues when the rider is hunched forward in an athletic or sports mode riding position (e.g., such as when pedaling quickly or aggressively with a road bike).

Furthermore, the padding 33 may vary in thickness along the length and width of the saddle 10 in order to reduce the ripple effect as a rider shifts into the hunched forward position. In particular, as a rider hunches forward into the sporty position, the padding 10 is configured to support certain anatomical parts of the rider's body which may include not only the ischium, but also the pubis and surrounding tissues located in front of the ischium. Therefore, for a preferred saddle 10 configured for hunched forward sporty riding, the thickness of the padding 33 in the front saddle portion 28 may be greater and may taper or decrease as the padding 33 extends towards the rear saddle portion 26.

In FIG. 1, the base 20 preferably comprises recesses 47 strategically positioned and shaped to receive the padding 33. Each recess 47 has a depth preferably ranging from 1 mm and to 5 mm, and comprises a shape conforming to the shape of the corresponding seat portion 37-1, 37-2. Thus, the border 48 of each recess 47 conforms to the periphery or edge of each padded seat portion 37-1, 37-2. Each padded portion 37-1, 37-2 has a height preferably in the range of 1 mm to 20 mm. In some preferred embodiments where the thickness of the padding 33 may vary from front to back, the preferred ranges of padding thickness comprise 5 mm in the front saddle portion 28 and 20 mm in the rear saddle portion.

Depending upon the depth of the recess 47 and the height of the padding 33, the top surface 49 of the padding 33 may be flush with the unpadded top surface 50 of the base 20. In the first preferred embodiment, the height of the padding 33 may be slightly greater than the depth of the recess 47 such that the top padding surface 49 protrudes slightly above the unpadded top base surface 50, thereby giving the rider a tactical and visual indication of the padding.

In the preferred embodiment, the padding 33 may also comprise a generally bright color (e.g., blue, orange, red, etc.) that is noticeably different and/or brighter than the saddle base 20 which may be formed with a more conventional dark seat color such as black or gray.

If the optional longitudinal slit 31 were omitted, then the padding 33 could comprise a single consolidated padded portion with an hourglass shape received in a single recess having a matching shape.

FIGS. 4-7 illustrate cross-sectional views of the first preferred saddle 10 wherein the rail 22 is coupled to a bottom of the saddle base 20 at multiple forward locations, or forward attachment points, 52 and multiple rear positions, rear attachment points, 54. The padding 33 is thus strategically placed on top of the base 20 so that the padded portions 37-1, 37-2 are positioned above said attachment points 52, 54 so as to help absorb shock from the road surface. Thus, the padding 33 sufficiently covers the rail attachment points 52, 54 and serves as shock absorbers positioned between the rail, which transmits shock from the road, and the rider's ischial tuberosities and surrounding tissues in contact with the saddle.

Figure 4:
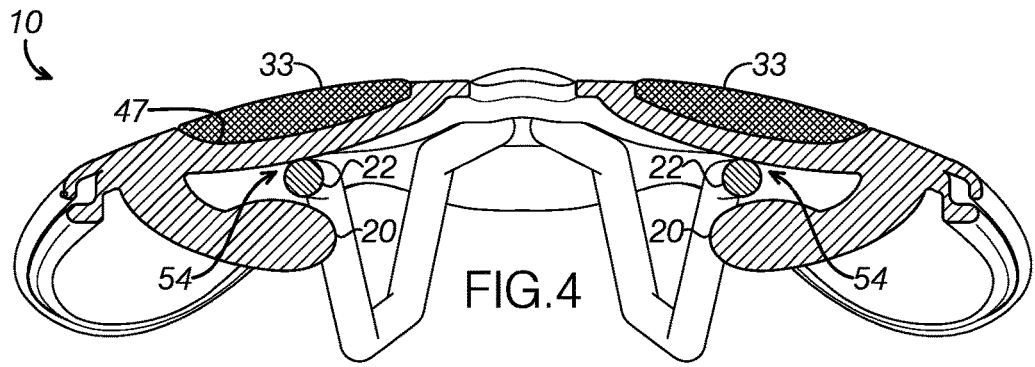
FIG. 4 is a cross-sectional of the first preferred embodiment of a bicycle saddle along lines 4-4 of FIG. 3.
Figure 5:
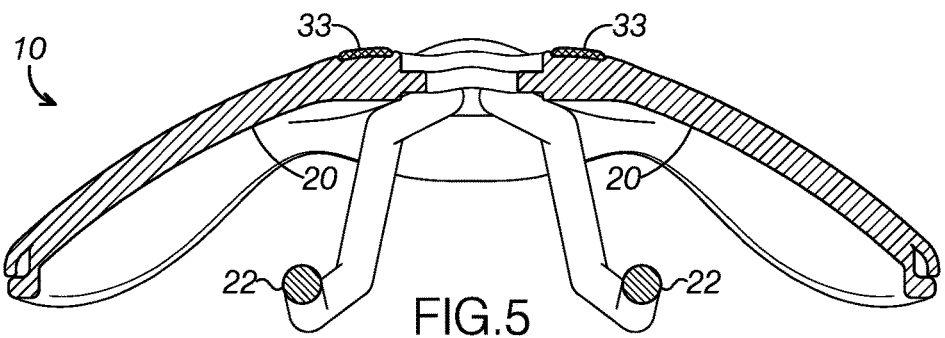
FIG. 5 is a cross-sectional of the first preferred embodiment of a bicycle saddle along lines 5-5 of FIG. 3.
Figure 6:
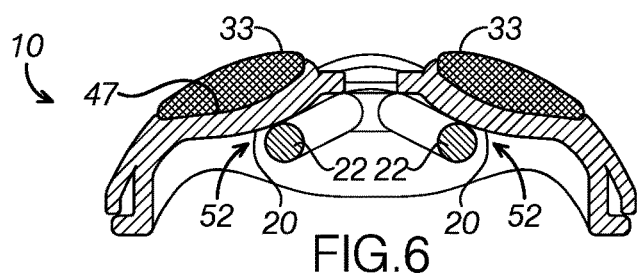
FIG. 6 is a cross-sectional of the first preferred embodiment of a bicycle saddle along lines 6-6 of FIG. 3.
Figure 7:
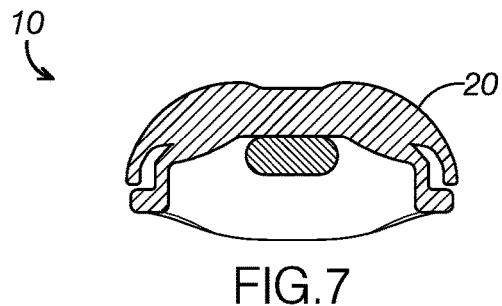
FIG. 7 is a cross-sectional of the first preferred embodiment of a bicycle saddle along lines 7-7 of FIG. 3.

In the preferred embodiment, the variable thickness of the padding 33 is illustrated in FIGS. 4-6. In FIG. 4, the padding 33 closer to the rear of the saddle 10 has a greater thickness. Therefore, the corresponding portion of the recess 47 has a greater depth to receive this thicker portion of the padding.

The middle padded portion 42 of the padding 33 (see FIG. 3) becomes significantly thinner as shown in FIG. 5 where there may be little or no recess therebeneath. As the padding 33 continues to extend towards the nose the saddle, the padding may increase in thickness as shown in FIG. 6. Again, a deeper portion of recess 46 in FIG. 6 may be used to receive a correspondingly thicker padding.

Referring back to FIGS. 2 and 3, it will be appreciated that the saddle base 10 includes a non-padded periphery 56 that forms the edge of the saddle base 20, and non-padded base portions 58 that surround the padded portions 37-1, 37-2 and extend to the periphery 56. These non-padded portions 58 include a non-padded nose portion 28, non-padded midsections 61 and non-padded tail portions 63. Thus the padded portions 37-1, 37-2 are laterally surrounded by non-padded portions of the saddle base 20, particularly along the front, rear and lateral borders of the padded portions 37-1, 37-2.

Though the periphery 56 forms a pear shape in the first illustrated embodiment, it is to be expressly understood that the saddle base may comprise a variety of shapes including wider front saddle portions and/or narrower rear saddle portions.

A second preferred embodiment of a saddle 210 is shown in FIGS. 8-9. The second preferred saddle 210 comprises a web saddle base 220 mounted to a rail 222. The saddle 210 preferably comprises web padding 233 disposed on top of the base 220. The padding 230 preferably comprises a web pattern that matches the web pattern of the underlying portions of the base 220, namely, shape and position of holes 232 in web padding 233 conforming to those of the holes 250 in the base 220.

In the second preferred embodiment, the web padding 230 comprises a pair of symmetrical elongate padded portions 237-1, 237-2 removably attached to a top surface of the saddle base 220.

The padding 233 preferably comprises a pair of elongate padded portions 237-1, 237-2 extending along the right and left sides of the saddle 210 and positioned in areas configured to support the sitting bones and adjacent tissues of the rider.

As shown in FIG. 8, from back to front, each padded seat portion 237-1, 237-2 preferably comprises a rear padded portion 239 with the greatest width in the range of 50 mm to 130 mm_that tapers as it extends to a middle padded portion 244 with a width in the range of 40 mm to 90 mm, which then terminates at a narrow front padded tip 246 with a width in the range of 20 mm to 80 mm. The widened front padded portion 244 and narrow padded tip 246 of each padded portion 237-1, 237-2 are preferably positioned in the front saddle portion 228, and thus in front of the midline M.

The elongate padded portions 237-1, 237-2 are preferably symmetrical. Collectively, the pair of symmetrically elongate padded portions 237-1, 237-2 form an hourglass shape. It will be appreciated that the first preferred saddle 210 comprises padding 244, 246 located in the front saddle portion 228.

In the second preferred embodiment, the padded portions 237-1, 237-2 may be composed of silicone rubber having a thickness in the range of 1 mm to 10 mm.

A third preferred embodiment of a saddle 310 is shown in FIGS. 10-11. The third preferred saddle 310 comprises a web saddle base 320 mounted to a rail 322. The saddle 310 preferably comprises web padding 330 integrally formed with the web base 320. The padding 333 preferably comprises a web pattern that is integrated or interwoven with the web pattern of the base 320. The saddle base 320 is composed of a first resin material. The web padding 333 is composed of a second resin material that is noticeably more flexible than the first resin material of the base 320.

In the third preferred embodiment, the web padding 333 comprises a pair of symmetrical elongate padded portions 337-1, 337-2 integrally formed with the saddle base 320. The elongate padded portions 337-1, 337-2 extend along the right and left sides of the saddle 310 and positioned in areas configured to support the sitting bones and adjacent tissues of the rider.

From back to front, each padded seat portion 337-1, 337-2 preferably comprises a rear padded portion 339 with the greatest width in the range of 50 mm to 130 mm_that tapers as it extends to a middle padded portion 344 with a width in the range of 10 mm to 40 mm, which then terminates at a narrow front padded tip 346 with a width in the range of 20 mm to 80 mm. The widened front padded portion 344 and narrow padded tip 246 of each padded portion 337-1, 337-2 are preferably positioned in the front saddle portion 328, and thus in front of the midline M.

The elongate padded portions 337-1, 337-2 are preferably symmetrical. Collectively, the pair of symmetrically elongate padded portions 337-1, 337-2 form an hourglass shape. It will be appreciated that the first preferred saddle 10 comprises padding 344, 346 located in the front saddle portion 328.

The padded portions 337-1, 337-2 may be composed of silicone rubber having a thickness in the range of 1 mm to 10 mm.

Figure 12:
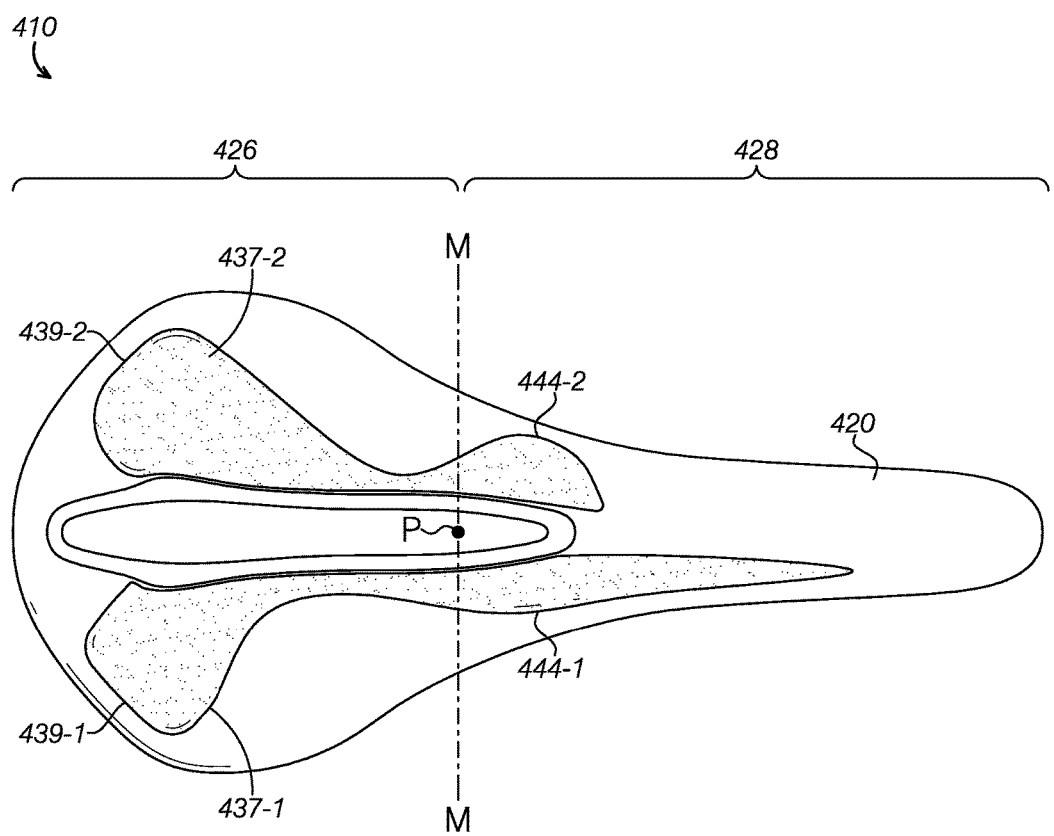
FIG. 12 is a top plan view of a fourth preferred embodiment of a bicycle saddle.

FIG. 12 shows a fourth preferred embodiment of a saddle 410 having asymmetrical padding 437-1, 437-2. Similar to the first preferred embodiment shown in FIG. 1, the fourth preferred saddle 410 in FIG. 12 comprises a web saddle base 420 mounted to a rail (not shown). As one example of the innumerable ways in which the padding may be asymmetrical, the illustrated embodiment in FIG. 12 shows a left padded seat portion 437-2 with a shorter length than that of the right padded seat portion 437-1. Also, the left padded seat portion 437-2 has a left rear padded seat portion 439-2 with a greater width than that of the right rear padded seat portion 439-1. A left front padded portion 444-2 also has a greater width than that of the right front padded portion 444-1. It is to be expressly understood, that the pair of padded seat portions 437-1, 437-2 may be configured in a limitless number of shapes and dimensions so as to be not only asymmetrical, but optimally so in order to conform to the unique anatomy (i.e., sitting bones and surrounding tissue) of a particular rider.

In the preferred embodiment, the padded portions 437-1, 437-2 are separately molded from the base 420. Collectively, the pair of padded portions 437-1, 437-2 form an asymmetrical hourglass shape. The midline M defines a front portion 428 and a rear portion 426 of the saddle 410. Each padded portion 437-1, 437-2 preferably comprises at least some padding located in the front portion 428 of the saddle 410.

In each of the preferred embodiments, shock absorbing padding is strategically placed to support the sitting bones and neighboring tissues of the rider in all riding positions ranging from a fully upright upper body posture to a nearly horizontal upper body posture. Thus, the padding is located in certain sections of the front saddle portion and may also be positioned above attachment points of the rail to the saddle base to absorb shock originating from the road. The padding is intentionally omitted from locations of the saddle which would not support sitting bones. Non-padded saddle portions are positioned in those non-supporting locations that surrounded the padded portions. This saves material, cost and weight and provides a highly efficient saddle that provides cushioned support in just the right places while omitting excess material that would cause drag on the rider.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A bicycle saddle, comprising;
   a saddle base defining a midline between a front saddle end and a rear saddle end; and
   saddle padding positioned on the saddle base so as to form padded portions surrounded by non-padded portions, the padded portions comprising a front padded portion positioned in front of the midline, the non-padded portions including a non-padded nose and a non-padded mid-section of a top surface of the saddle base.

2. The bicycle saddle of claim 1, wherein the saddle base comprises a recessed section at least 1 mm deep to receive the padded portions, an outer periphery of the recessed section conforming to an outer periphery of the padded portions.

3. The bicycle saddle of claim 1, wherein the saddle padding is separate from the saddle base.

4. The bicycle saddle of claim 1, wherein the saddle padding is integral with the saddle base.

5. The bicycle saddle of claim 4, wherein:
   the saddle base is composed of a first resin material;
   the saddle padding is composed of a second resin material that is more flexible than the first resin material.

6. The bicycle saddle of claim 1, wherein the saddle padding comprises an hourglass shape.

7. The bicycle saddle of claim 1, wherein the saddle padding is asymmetrical.

8. A bicycle saddle, comprising:
   a saddle base including a base thickness;
   a rail coupled to a bottom of the saddle base at a rail attachment point; and
   saddle padding disposed on a top side of the saddle base and having a padding thickness noticeably thicker than the base thickness, the saddle padding positioned in locations above the rail attachment point,
   wherein the saddle padding is surrounded by non-padded portions of the saddle base, the non-padded portions including a non-padded nose and a non-padded mid-section of a top surface of the saddle base.

9. The bicycle saddle of claim 8, wherein the saddle base comprises a recessed section at least 1 mm deep to receive the padded portions, an outer periphery of the recessed section conforming to an outer periphery of the padded portions.

10. The bicycle saddle of claim 8, wherein the saddle padding is separate from the saddle base.

11. The bicycle saddle of claim 8, wherein the saddle padding is integral with the saddle base.

12. The bicycle saddle of claim 11, wherein:
   the saddle base is composed of a first resin material;
   the saddle padding is composed of a second resin material that is more flexible than the first material.

13. The bicycle saddle of claim 8, wherein the saddle padding comprises an hourglass shape.

14. The bicycle saddle of claim 8, wherein the saddle padding is asymmetrical.

15. A bicycle saddle, comprising
   a saddle base including a base thickness, a saddle front end and a saddle back end, the saddle base defining a transverse midline intersecting a center between the saddle front end and the saddle back end;

a rail coupled to a bottom of the saddle base at a first forward rail attachment point and a second rear attachment point; and saddle padding disposed on a top side of the saddle base and having a padding thickness noticeably thicker than the base thickness, the saddle padding positioned in locations above the first and second rail attachment points, wherein the saddle padding is surrounded by non-padded portions of the saddle base, the non-padded portions including a non-padded nose and a non-padded midsection of a top surface of the saddle base, and wherein the saddle padding comprises a padded portion positioned in front of the midline.

16. The bicycle saddle of claim 15, wherein the saddle base comprises a recessed section at least 1 mm deep to receive the padded portions, an outer periphery of the recessed section conforming to an outer periphery of the padded portions.

17. The bicycle saddle of claim 15, wherein the saddle padding is separate from the saddle base.

18. The bicycle saddle of claim 15, wherein the saddle padding is integral with the saddle base.

19. The bicycle saddle of claim 18, wherein:
the saddle base is composed of a first resin material;
the saddle padding is composed of a second resin material that is more flexible than the first material.

20. The bicycle saddle of claim 15, wherein the saddle padding comprises an hourglass shape.

21. The bicycle saddle of claim 15, wherein the saddle padding comprises a top saddle surface that protrudes above a top surface of the non-padded saddle base portions.

22. The bicycle saddle of claim 15, wherein the saddle padding is asymmetrical.

* * * * *